A. H. MALM AND C. A. MARWEDEL.
BAGGAGE FASTENER.
APPLICATION FILED MAR. 12, 1918. RENEWED JUNE 21, 1920.
1,370,218. Patented Mar. 1, 1921.
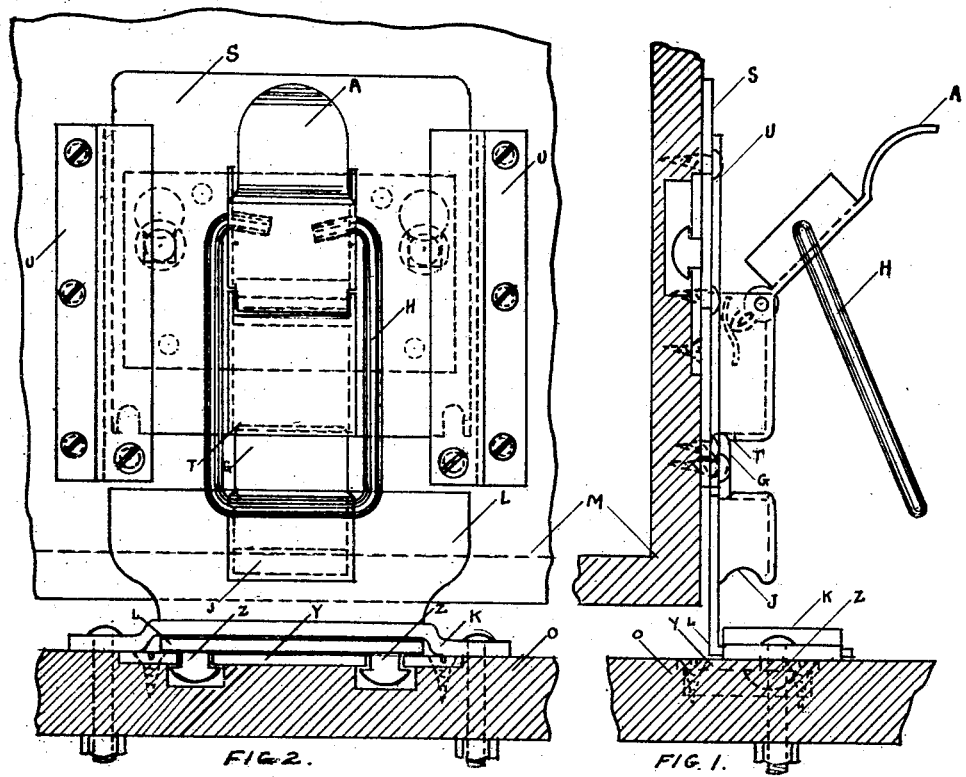
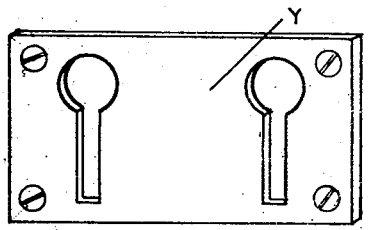
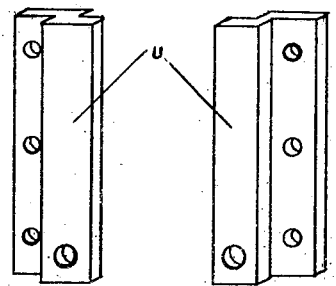
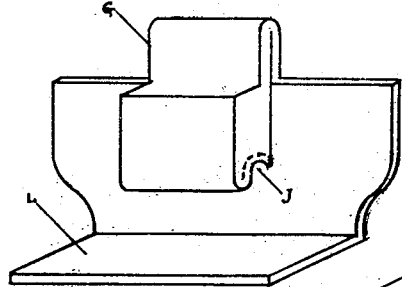
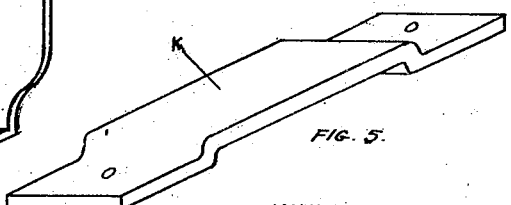
INVENTORS.
Arthur Herbert Malm
Charles Arthur Marwedel.

UNITED STATES PATENT OFFICE.

ARTHUR HERBERT MALM AND CHARLES ARTHUR MARWEDEL, OF SAN FRANCISCO, CALIFORNIA.

BAGGAGE-FASTENER.

1,370,218.    Specification of Letters Patent.    Patented Mar. 1, 1921.

Application filed March 12, 1918, Serial No. 221,945. Renewed June 21, 1920. Serial No. 390,671.

*To all whom it may concern:*

Be it known that we, ARTHUR HERBERT MALM and CHARLES ARTHUR MARWEDEL, citizens of the United States of America, and residing in the city and county of San Francisco, State of California, have invented certain new Baggage-Fasteners; and we do hereby declare the following to be a full, clear, and exact description of the invention which will enable others skilled in the art to which it appertains to make and use the same.

This invention relates to a new and novel improvement in baggage fasteners.

The principal object of this invention is to provide a baggage fastener which may be readily detached from baggage and leave no protruding parts which are liable to be damaged in transit.

Another object of this invention is to provide means whereby baggage may be attached to the running board of an automobile in such a manner that all connections may be easily removed after the baggage has been removed.

Further objects and advantages of this invention will be set forth in the detailed description which now follows:—

In the drawings:—

Figure 1 discloses our invention in side elevation attached to the running board of an automobile and to the side of a baggage receptacle, both of which are shown in cross section.

Fig. 2 is a side elevation of our invention applied to the running board of an automobile and to a piece of baggage, the running board being shown in cross section.

Fig. 3 is a detail view of the slide members.

Fig. 4 is a detail view of an attachment plate.

Fig. 5 is a detail view of a running board plate.

Fig. 6 is a detail view of a removable connector.

Like numerals refer to corresponding parts in the several views of the drawings.

Attached to the usual running board of an automobile is a plate Y suitably secured by screws or bolts, as best suits the convenience of the user. This plate is provided with circular openings near one side thereof, and with slots communicating with said circular openings. An angle plate L is provided having a portion G folded upon itself and properly bent to form a catch J. The lower portion of this angle member L carries lugs Z which are adapted to pass through the circular openings in the plate Y and be slid longitudinally so that the heads of the lugs Z will be retained against withdrawal.

It is obvious that we may use a plate such as is shown at K for accomplishing the same purpose as that accomplished by the lugs Z.

Upon the article to be carried be provide attaching means similar to those just described, that is, a plate similar to Y adapted to retain lugs on a plate S. This plate S carries a hasp A having a yoke H pivoted thereon. We have shown slides U as an alternative method for attaching the plate S. This plate S is provided with a slot T in its lower portion adapted to receive the male member G of the angle member L. This will bring the hasp A and yoke H directly above the catch J, so that the yoke H may be brought under, so as to engage the catch J, which will result in firmly attaching the plate S to the angle member L when the hasp A is swung upon its pivot and into contact with the plate S. The hasp A will seat in this position due to the fact that the loop H is offset from the pivot point of the hasp A.

The operation of our device is as follows:—Plates Y are attached to the articles to be carried and to the running board of an automobile at suitable points. The plate attached to the package is so placed that said package will be held a short distance above said running board. An L-shaped member such as is shown in Fig. 6 is then engaged in the plate Y of the running board and a plate S carrying a hasp A is attached to the package, after which the package is so placed that the plate A will be above the angle member L, at which time the hasp may be swung so that the loop H will engage the catch J and firmly attach said members together.

It will be seen that we have provided a very simple means of attaching baggage to the running board of a car, which attaching means may be removed quickly and without leaving any parts which will project an appreciable amount.

Having thus described our invention what we claim as new and desire to secure by Letters Patent of the United States is as follows:—

In a baggage fastener, the combination of a plate adapted to be attached to a suitable support, orifices in said plate, an L-shaped member, lugs carried on said L-shaped member and adapted to engage said plate through said orifices, a catch carried by said L-shaped member, a plate attached to an article of baggage, a removable plate having engagement with said attached plate, and a hasp carried by said removable plate and adapted to engage said catch so as to retain said L-shaped plate and said detachable plate in fixed position.

ARTHUR HERBERT MALM.
CHARLES ARTHUR MARWEDEL.